United States Patent
Caspi

(10) Patent No.: US 9,334,982 B2
(45) Date of Patent: May 10, 2016

(54) TIE ROD SUPPORT APPARATUS FOR LARGE PRESSURE VESSEL PIPING

(71) Applicant: Shamay Caspi, Toronto (CA)

(72) Inventor: Shamay Caspi, Toronto (CA)

(73) Assignee: Whiting Equipment Canada Inc., Welland (CA)

( * ) Notice: Subject to any disclaimer, the term of this patent is extended or adjusted under 35 U.S.C. 154(b) by 273 days.

(21) Appl. No.: 13/790,606

(22) Filed: Mar. 8, 2013

(65) Prior Publication Data

US 2014/0252176 A1   Sep. 11, 2014

(51) Int. Cl.
| | |
|---|---|
| *F16L 3/16* | (2006.01) |
| *F16B 5/02* | (2006.01) |
| *F16B 39/12* | (2006.01) |
| *F16B 43/02* | (2006.01) |

(52) U.S. Cl.
CPC ... *F16L 3/16* (2013.01); *F16B 5/02* (2013.01); *F16B 39/12* (2013.01); *F16B 43/02* (2013.01)

(58) Field of Classification Search
CPC ............ F16B 5/02; F16B 39/12; F16B 43/02; B62D 7/20
USPC ......... 248/500, 530, 533, 156, 351, 499, 352, 248/354.1; 403/44, 46, 109.1–109.8; 280/93.51, 93.502
See application file for complete search history.

(56) References Cited

U.S. PATENT DOCUMENTS

| | | | | |
|---|---|---|---|---|
| 142,619 | A * | 9/1873 | Eastman et al. ............... | 384/444 |
| 4,029,275 | A * | 6/1977 | Erismann ...................... | 248/680 |
| 4,060,118 | A * | 11/1977 | Papafingos et al. ............. | 159/49 |
| 4,090,916 | A * | 5/1978 | Papafingos et al. ............. | 159/9.2 |
| 4,520,600 | A * | 6/1985 | Bordet .............................. | 52/83 |
| 4,704,155 | A * | 11/1987 | Matesa et al. ................... | 65/347 |
| 4,726,529 | A * | 2/1988 | Nislar et al. .................... | 239/742 |
| 5,580,102 | A * | 12/1996 | Stultz .............................. | 285/61 |
| 6,059,251 | A * | 5/2000 | Gutelius et al. ................ | 248/500 |
| 6,427,803 | B1 * | 8/2002 | Moore ............................ | 182/107 |
| 6,591,564 | B2 * | 7/2003 | Cusimano ........................ | 52/274 |
| 6,786,173 | B2 * | 9/2004 | Courtemanche ............. | 116/63 P |
| 7,788,993 | B2 * | 9/2010 | Wood ........................... | 74/579 R |
| 7,905,464 | B2 * | 3/2011 | Fabbri ........................... | 248/622 |
| 8,424,642 | B2 * | 4/2013 | Lietz ............................. | 182/172 |
| 2009/0218777 | A1 * | 9/2009 | Wood .......................... | 280/93.51 |
| 2009/0314894 | A1 * | 12/2009 | Frisch et al. .................. | 244/131 |
| 2011/0285044 | A1 * | 11/2011 | Sollars ............................ | 264/31 |
| 2012/0014493 | A1 * | 1/2012 | Frank et al. .................... | 376/260 |
| 2012/0018942 | A1 * | 1/2012 | Penza ........................... | 269/287 |
| 2014/0138927 | A1 * | 5/2014 | Poloni et al. ................ | 280/93.51 |

* cited by examiner

*Primary Examiner* — Nkeisha Smith
(74) *Attorney, Agent, or Firm* — Bennett Jones LLP

(57) ABSTRACT

A tie rod support apparatus for a large pressure vessel system. The tie rod support apparatus comprises a tie bar, an upper bearing unit, a bottom bearing unit and a tie rod support base. The upper bearing unit is coupled to a pipe section or other component in the large pressure vessel system and includes a bearing to provide a pivotally moveable connection point. The bottom bearing unit is coupled to the other end of the tie rod and configured with the tie rod support base. The tie rod support base is connected or attached to a support surface (e.g. a concrete slab or block) that is independent from the large pressure vessel system. The bottom bearing unit may include a bearing to provide another pivotally moveable connection point. According to an embodiment, the tie rod support includes a length adjustment mechanism configured to allow adjustment of the length or span of the tie bar. According to an embodiment, the tie rod support includes a spring block configured to allow flexing of the tie rod support assembly.

12 Claims, 6 Drawing Sheets

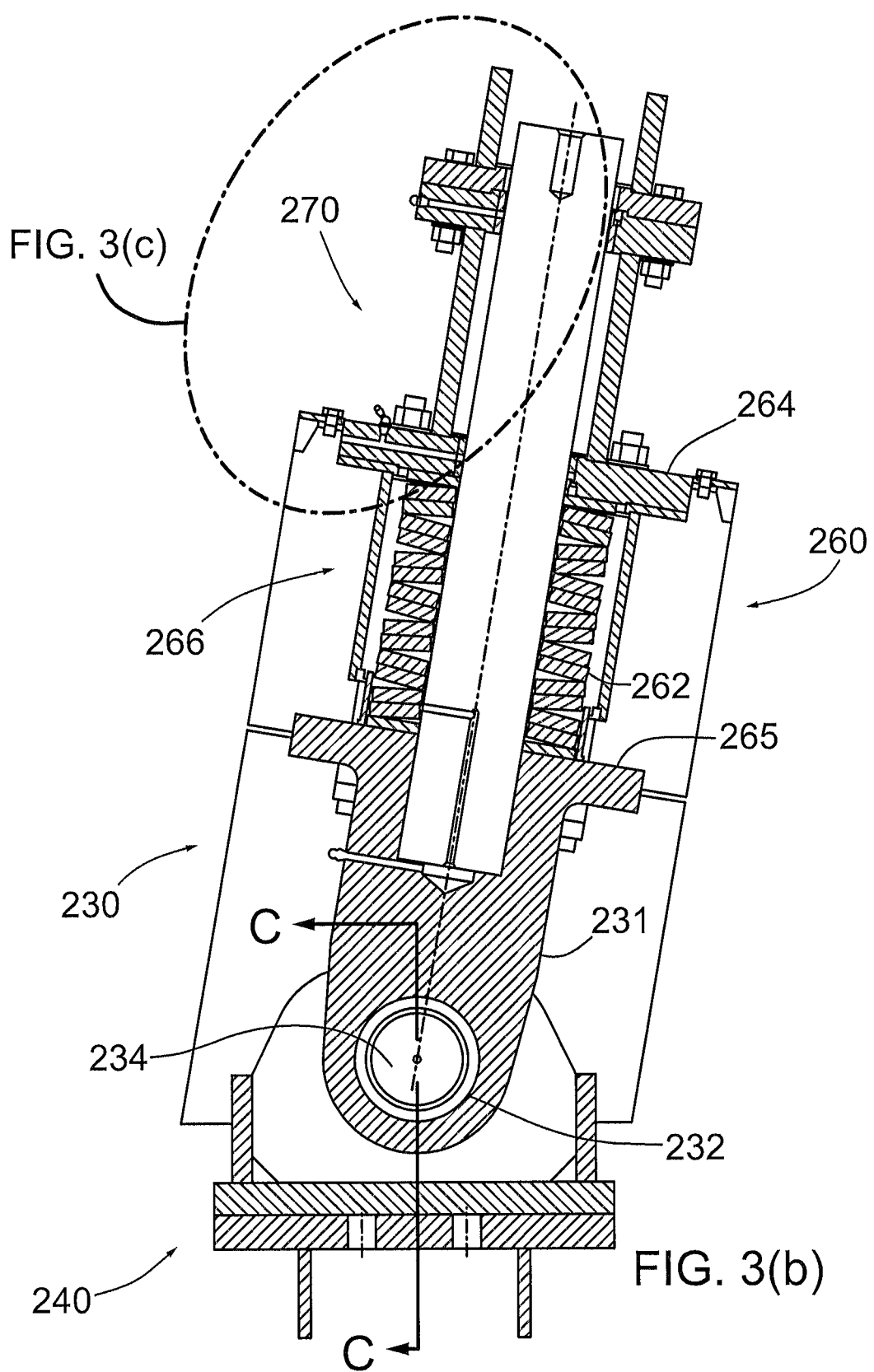

TOP PIN
SCALE 0.250

BOTTOM PIN
SECTION C-C
SCALE 0.250

MMAT SHOP
SET UP
SEE TABLE FOR
OPERATING GAP

US 9,334,982 B2

TIE ROD SUPPORT APPARATUS FOR LARGE PRESSURE VESSEL PIPING

BACKGROUND OF THE INVENTION

The present invention relates to large pressure vessel systems, and more particularly, to a tie rod support apparatus for supporting or configuring pipes and piping for a large pressure vessel or large pressure vessel system.

BACKGROUND OF THE INVENTION

Large pressure vessel systems such as found in industrial applications or processes, for example, salt evaporators for potash, comprise one or more large pressure vessels and large diameter piping. The piping is interconnected with the large pressure vessels. The large diameter piping can represent significant loads for both long and short spans. The large diameter piping also represents significant loads that are applied to connection points, such as pump flanges and vessel nozzles.

While there are known rod supports for supporting the loads associated with the large diameter piping, there are shortcomings. For example, tie rods are supported by the vessel structures themselves which results in deflection, which is not desirable.

Accordingly, there remains a need for improvements in the art.

BRIEF SUMMARY OF THE INVENTION

The present invention comprises embodiments of a tie rod support apparatus and configuration suitable for supporting large diameter piping and other components in a large pressure vessel system.

According to an embodiment, the present invention comprises a tie rod apparatus configured for supporting a pipe span in a large pressure vessel system, the tie rod apparatus comprises: a tie bar; an upper bearing unit coupled to one end or upper end of the tie bar; a tie bar support base coupled to another end or lower end of the tie bar, the tie bar support base being configured to be supported by a structural element independent of the large pressure vessel system; and the upper bearing unit being configured to couple one end of the tie bar to the pipe span, and the upper being unit including a bearing configured to provide a pivotal connection point between the tie bar and the pipe span.

According to another embodiment, the present invention comprises a large pressure vessel system, the large pressure vessel system comprises: a pressure vessel configured for a process; one or more large diameter pipe sections, the one or more large diameter pipe sections being coupled directly or indirectly to the pressure vessel; one or more tie rod supports, each of the one or more tie rod supports including, a tie bar; an upper bearing unit coupled to one end of the tie bar; a tie bar support base coupled to another end of the tie bar, the tie bar support base being configured to be supported by a structural element independent of the large pressure vessel system; and the upper bearing unit being configured to couple one end of the tie bar to one of the large diameter pipe sections, and the upper bearing unit including a bearing configured to provide a pivotal connection point between the tie bar and the large diameter pipe section.

Other aspects and features according to the present application will become apparent to those ordinarily skilled in the art upon review of the following description of embodiments of the invention in conjunction with the accompanying figures.

BRIEF DESCRIPTION OF THE DRAWINGS

Reference will now be made to the accompanying drawings which show, by way of example, embodiments according to the present application, and in which:

FIG. 3(b) shows a detailed sectional view of the bottom bearing unit and the tie rod support base for the tie rod apparatus of FIG. 3(a);

Like reference numerals indicate like or corresponding elements in the drawings.

DETAILED DESCRIPTION OF THE EMBODIMENTS

Figure 1:
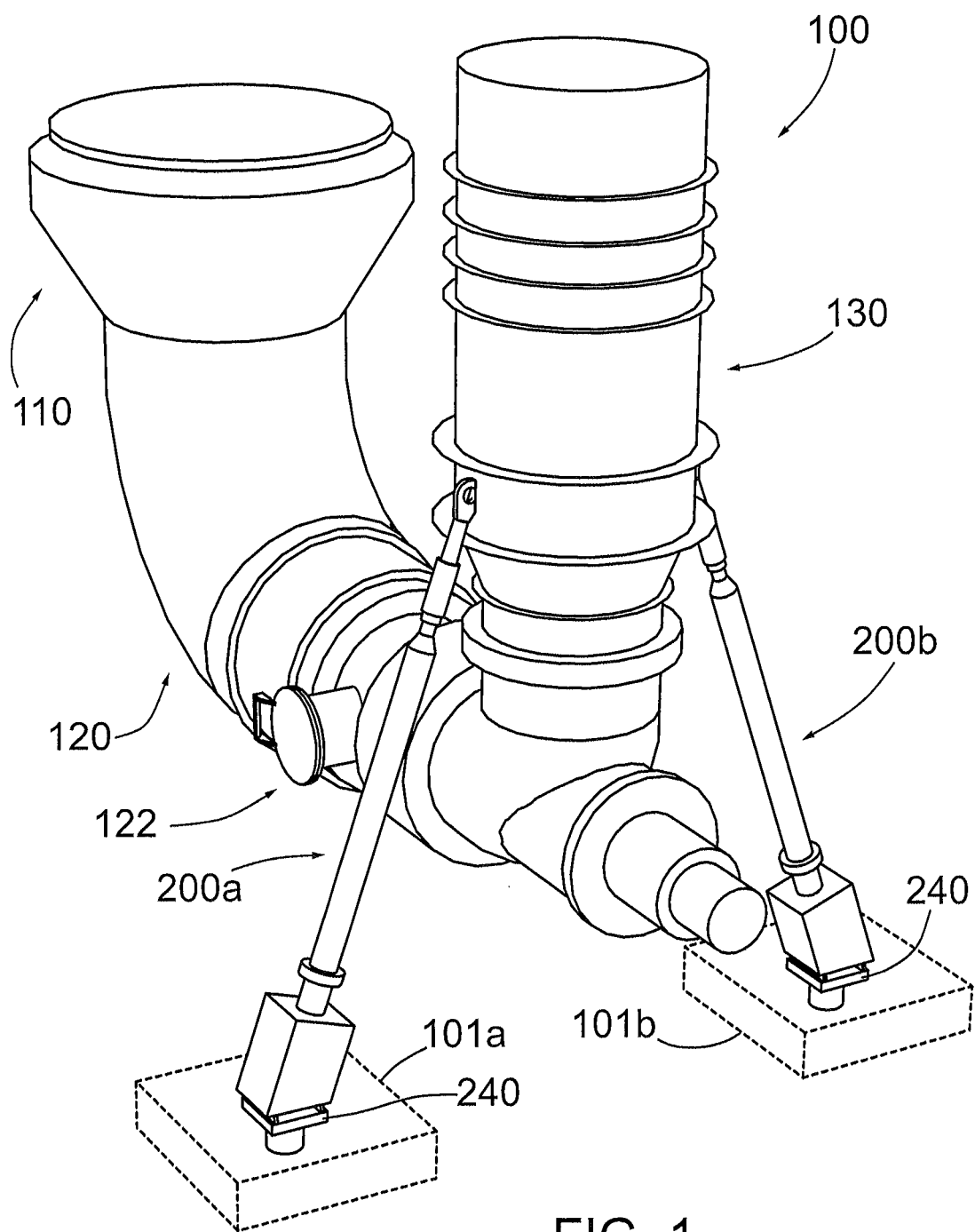
FIG. 1 shows an exemplary large pressure vessel system comprising a tie rod support apparatus or assembly according to an embodiment of the present invention.

Reference is first made to FIG. 1, which shows an exemplary large pressure vessel system comprising a tie rod support apparatus or assembly according to an embodiment of the invention. The large pressure vessel system is indicated generally by reference 100 and according to an embodiment comprises a large pressure vessel 110 having a pipe section 120. According to the exemplary implementation, the pipe section 120 is coupled through a junction 122 to another a pipe section, i.e. a large diameter pipe, indicated generally by reference 130. As shown in FIG. 1, the large diameter pipe 130 is supported by a pair of tie rod support apparatus or assemblies 200, indicated individually by references 200a and 200b. It will be appreciated that while the large diameter pipe 130 is depicted with two tie rod supports 200, other configurations are possible.

Figure 2:
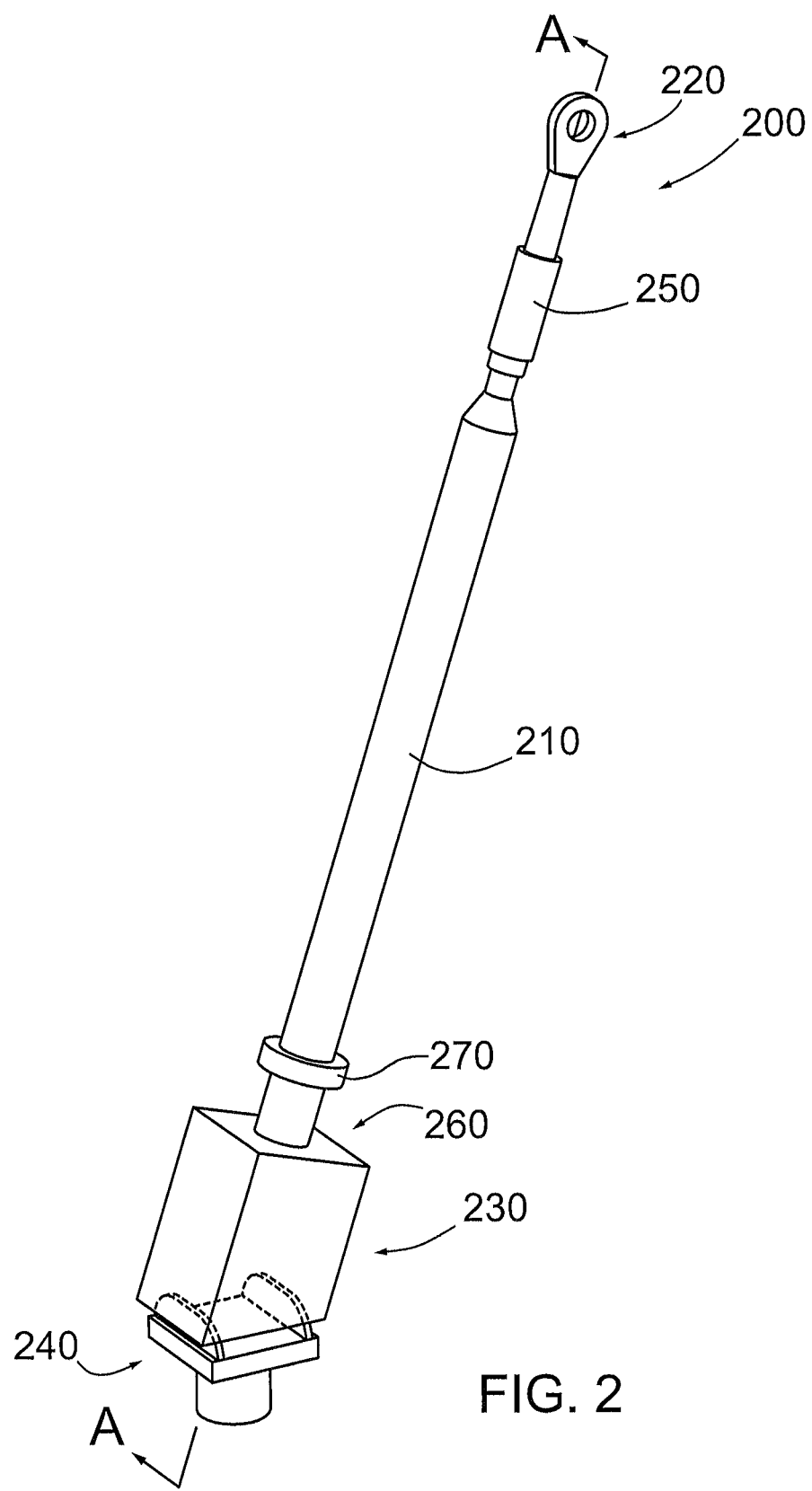
FIG. 2 shows the tie rod apparatus of FIG. 1 according to an embodiment of the present invention.

As shown in FIG. 2, the tie rod support 200 comprises a tie bar 210, an upper bearing unit 220, a bottom bearing unit 230 and a tie rod support base 240. According to another aspect, the tie rod support assembly 200 includes a length adjuster indicated generally by reference 250 and comprising, for example, a turnbuckle mechanism configured for adjusting the length of the tie bar 210, as will be described in more detail below. According to another aspect, the tie rod support 200 includes a spring block or pack indicated generally by reference 260 and also shown in FIG. 3, and described in more detail below.

Referring back to FIG. 1, the upper bearing unit 220 on the tie rod support 200 is coupled to a section or surface of the large diameter pipe 130. According to an embodiment, the upper bearing unit 220 includes two linear bearings in a spaced configuration which engage a guide pin and allow the upper bearing unit 220 to move up and down along the pin, as described in more detail below. According to another aspect, the tie rod supports 200 are supported or anchored to the ground or foundation. For example, as shown in FIG. 1, the tie rod support base 240 for each of the tie rod supports 200 is anchored or supported on a concrete slab, block or section (or other type of suitable foundation) indicated by references 101a and 101b. It will be appreciated that this configuration provides a stiffer support structure, that is, for example, not deflected by the forces imposed on it, as would be the case where the tie rod supports 200 are connected or supported by the pressure vessel system structure.

Figure 3A:
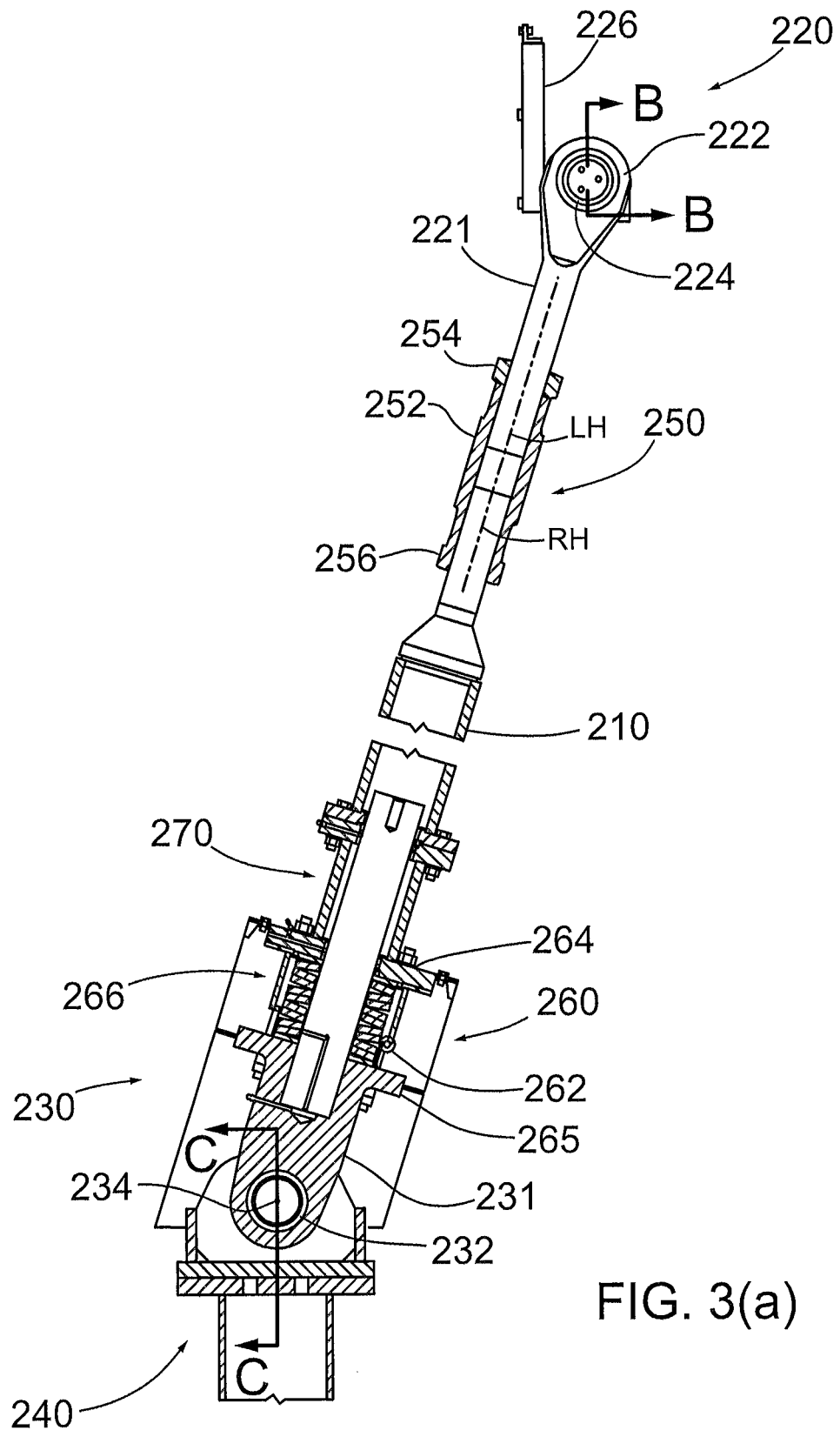
FIG. 3(a) shows a sectional view of the tie rod apparatus FIG. 2 taken along line A-A, according to an embodiment of the present invention.

Reference is next made to FIG. 3(a), which shows the tie rod support 200 in greater detail and comprises a sectional view taken along line A-A in FIG. 2.

Figure 3C:
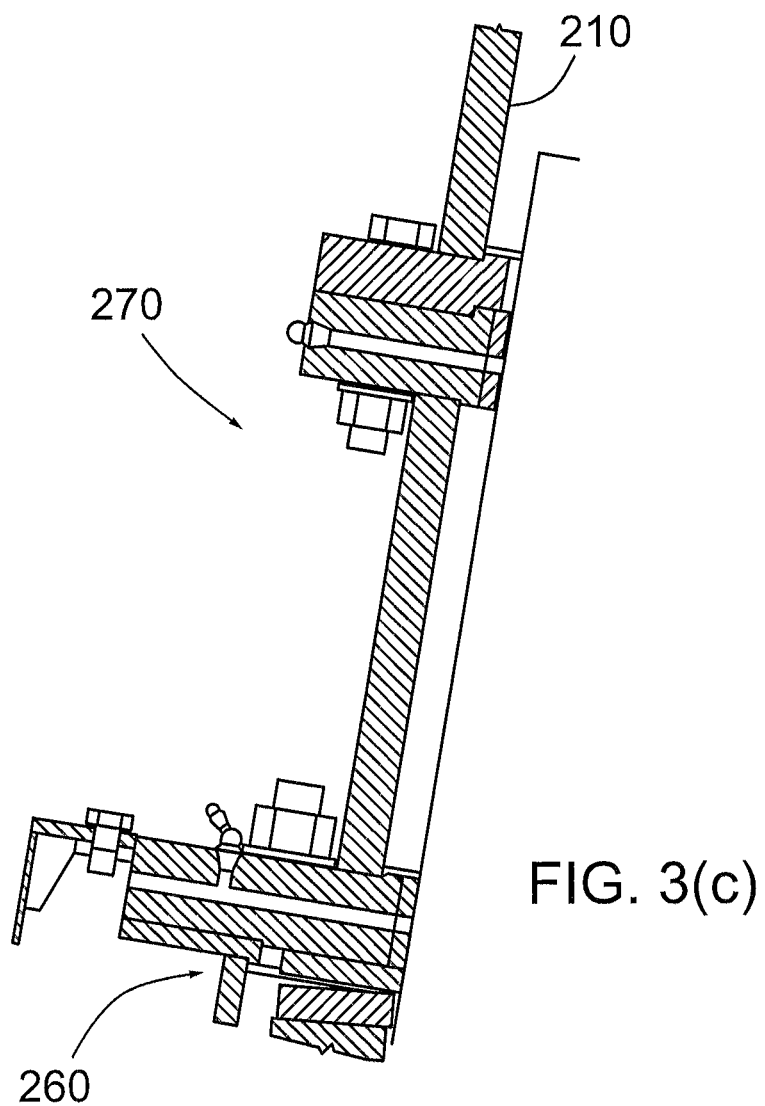
FIG. 3(c) shows a detailed sectional view of a tie rod connection mechanism in the tie rod apparatus of FIG. 3(a)
Figure 3D:
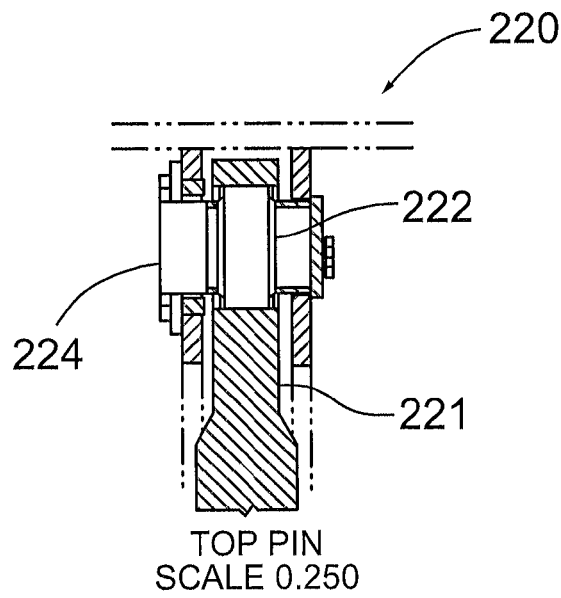
FIG. 3(d) shows a detailed sectional view of the upper bearing unit taken along line B-B.

As shown in FIGS. 3(a) and 3(d), the upper bearing unit 220 comprises a rod eye 221 configured with a bearing 222 (e.g. a spherical plain bearing). The bearing 222 receives a tie bar pin indicated generally by reference 224. The tie bar pin 224 is pivotally coupled to an upper bearing housing or cover 226, which is, in turn, connected or joined to the large diameter pipe 130 (FIG. 1), for example, using bolts or other suitable fasteners, or welding techniques. The pivotal connection between the upper bearing unit 220 and the large diameter pipe 130 allows a range or degree of movement.

Figure 3E:
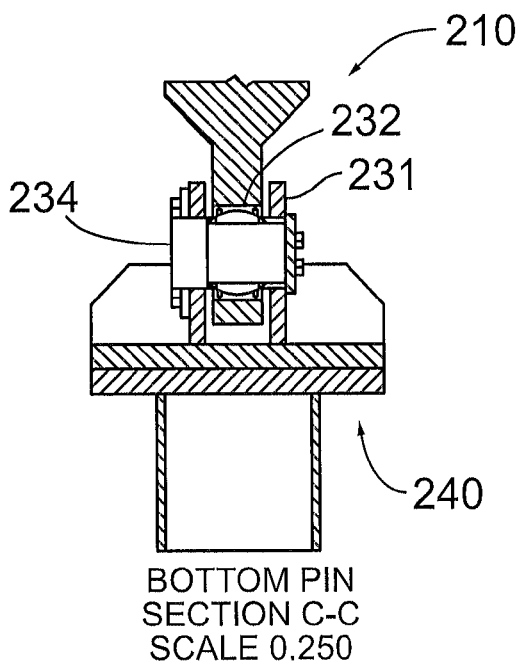
FIG. 3(e) shows a detailed sectional view of the bottom bearing unit taken along line C-C.

Referring to FIGS. 3(a) and 3(e), the bottom bearing unit 230 comprises a bottom bearing block indicated generally by reference 231. The bottom bearing block 231 is configured with a bearing 232, for example, a spherical plain bearing, which receives and supports a lower tie rod pin 234. The lower tie rod pin 234 is pivotally coupled to the tie rod support base 240 and provides another pivotally movable connection point.

Referring again to FIG. 3(a), the length adjuster 250 is configured to provide the capability to adjust the effective length of the tie rod support 200 in the field. According to an embodiment, the length adjuster 250 comprises a turnbuckle 252, an upper nut 254 and a lower nut 256. The turnbuckle 252 comprises a threaded-barrel or sleeve which engages a threaded section on the rod eye 221 and a threaded section on the tie bar 210. The upper nut 254 is tightened against the turnbuckle 252 to secure the rod eye 210 in position. Similarly, the lower nut 256 is tightened against the other end of the turnbuckle to secure the tie bar 210 into position.

Figure 4:
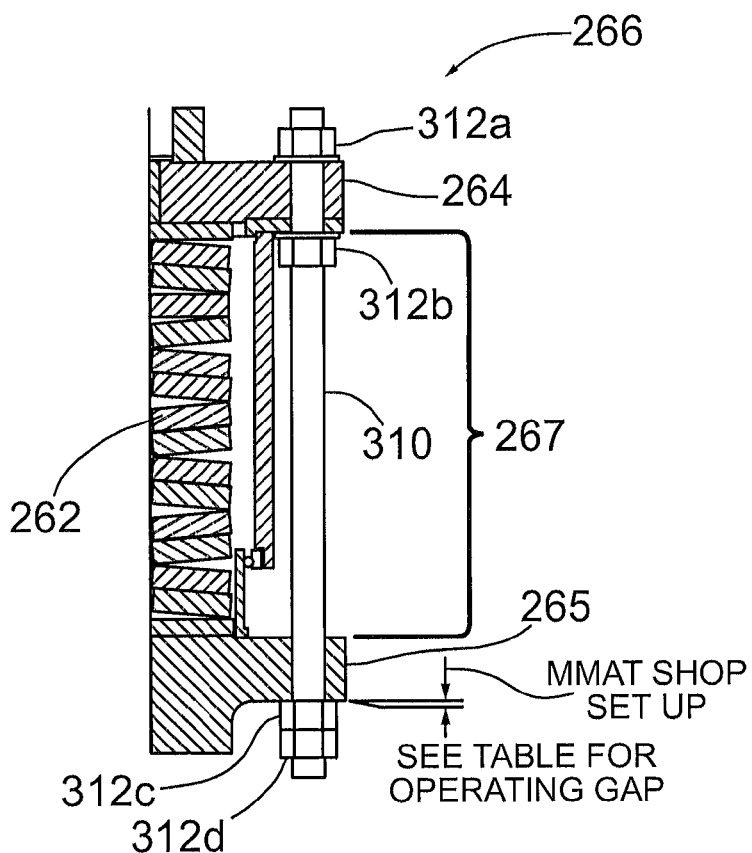
FIG. 4 is a partial cut-away view of a deflection measurement mechanism according to an embodiment of the present invention.

According to an embodiment, the tie rod support 200 includes the spring block or pack 260. The spring block 260 is configured to provide the tie rod support 200 with a degree to flexibility, for example, to accommodate movement in the large diameter piping arising from thermal expansion or the like. As shown in FIGS. 3(a) and 3(b), the spring block 260 comprises a spring (e.g. a disc spring) 262 and an adjustment plate 264. The spring 262 has a lower face which rests (i.e. is supported) by a flange 265 on the bottom bearing block 231. The spring block 260 includes a compression adjustment mechanism 266 as shown in more detail in FIG. 4. The compression adjustment mechanism 266 comprises a pair of threaded bars 310 and locking nuts 312 (indicated individually by references 312a, 312b, 312c and 312d for partial cut-away view in FIG. 4) that couple the adjustment plate 264 to the flange 265 and are configured to allow the adjustment plate 264 to secure and further compress and/or expand the spring 262 to adjust the spring compression. According to another embodiment, the spring block 260 deflection can be measured between the adjustment plate 264 and the flange 265, i.e. the gap indicated generally by reference 267, as shown in FIG. 4.

According to an embodiment, the tie rod support 200 includes a tie rod connection mechanism or block indicated generally by reference 270 in FIG. 3(a) and shown in more detail in FIG. 3(c). According to one implementation, the tie rod connection mechanism 270 is configured to couple the tie bar 210 to the spring block or pack 260 and/or the bottom bearing unit 230 and tie rod support base 240.

In summary and according to embodiments of the present invention, one or more tie rod supports or assemblies 200 are coupled to piping sections or other components of a large pressure vessel system 100 for example as shown in FIG. 1. One end of the tie rod support 200, i.e. the upper bearing unit 220, is coupled or connected to a system component, e.g. a section of a large diameter pipe 130. The other end of the tie rod support 200, i.e. the tie rod support base 240 is anchored independently of the large pressure vessel system 100, for example, in concrete pads or a foundation. This arrangement serves to provide a stiffer supporting point that typically occurs if the support member is coupled directly to the system 100. The upper bearing unit 220 and/or the bottom bearing unit 230 include a bearing (e.g. a spherical bearing) to provide a pivotally moveable connection point. According to another aspect, the tie rod assembly 200 includes the length adjustment mechanism 250 configured to provide the capability to adjust the length or span of the tie rod support 200 in the field or at an installation site. According to another aspect, the tie rod assembly 200 includes the spring block 260, which is configured to allow flexing of the tie rod assembly 200.

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description, and all changes which conic within the meaning and range of equivalency of the claims are therefore intended to be embraced therein.

What is claimed is:

1. A tie rod apparatus configured for supporting a pipe span in a large pressure vessel system, said tie rod apparatus comprising:
   a tie bar;
   an upper bearing unit coupled to one end of said tie bar;
   a tie bar support base coupled to another end of said tie bar, said tie bar support base being configured to be supported by a structural element independent of the large pressure vessel system;
   said upper bearing unit being configured to couple one end of said tie bar to the pipe span, and said upper being unit including a bearing configured to provide a pivotal connection point between said tie bar and the pipe span; and
   a spring block comprising a spring, said spring block being configured to permit flexing of said tie bar.

2. The tie rod apparatus as claimed in claim 1, further including a lower bearing unit, said lower bearing unit being coupled to said tie bar support base and to said another end of said tie bar, and said lower bearing unit including a bearing configured to provide a pivotal connection point between said tie bar and said tie bar support base.

3. The tie rod apparatus as claimed in claim 2, wherein said upper bearing unit includes two linear bearings configured to permit the tie bar to flex in a generally up and down direction.

4. The tie rod apparatus as claimed in claim 2, further including a length adjustment mechanism configured to adjust a length of said tie bar in a field installation.

5. The tie rod apparatus as claimed in claim 4, wherein said length adjustment mechanism comprises a turnbuckle mechanism.

6. The tie rod apparatus as claimed in claim 1, wherein said spring block includes a mechanism configured to measure deflection of said spring.

7. A large pressure vessel system comprising:
a pressure vessel configured for a process;
one or more large diameter pipe sections, said one or more large diameter pipe sections being coupled directly and indirectly to said pressure vessel;
one or more tie rod supports, each of said one or more tie rod supports including,
a tie bar;
an upper bearing unit coupled to one end of said tie bar;
a tie bar support base coupled to another end of said tie bar, said tie bar support base being configured to be supported by a structural element independent of the large pressure vessel system;
said upper bearing unit being configured to couple one end of said tie bar to one of said large diameter pipe section, and said upper being unit including a bearing configured to provide a pivotal connection point between said tie bar and said large diameter pipe section; and
said tie bar support base including a spring block comprising a spring, said spring block being configured to permit flexing of said tie bar.

8. The large pressure vessel system as claimed in claim 7, wherein said tie bar support includes a lower bearing unit, said lower bearing unit being coupled to said tie bar support base and to said another end of said tie bar, and said lower bearing unit including a bearing configured to provide a pivotal connection point between said tie bar and said tie bar support base.

9. The large pressure vessel system as claimed in claim 8, wherein said tie bar support includes an upper bearing unit having two linear bearings configured to permit the tie bar to flex in a generally up and down direction.

10. The large pressure vessel system as claimed in claim 8, wherein said tie bar support includes a length adjustment mechanism configured to adjust a length of said tie bar in a field installation.

11. The large pressure vessel system as claimed in claim 10, wherein said length adjustment mechanism comprises a turnbuckle mechanism.

12. The large pressure vessel system as claimed in claim 7, wherein said spring block includes a deflection meter configured to determine deflection of said spring.

* * * * *